United States Patent

Sirico

[11] Patent Number: 5,795,020
[45] Date of Patent: Aug. 18, 1998

[54] CHILD SAFETY SEAT WITH A HEAD PROTECTOR

[76] Inventor: Frank Sirico, 40 Frank St., Lindenhurst, N.Y. 11757

[21] Appl. No.: 936,954
[22] Filed: Sep. 25, 1997
[51] Int. Cl.⁶ .................................................. B60N 2/28
[52] U.S. Cl. .......................... 297/256.15; 297/216.11; 297/487
[58] Field of Search .................. 297/216.11, 250.1, 297/256.15, 487, 488

[56] References Cited

U.S. PATENT DOCUMENTS

| | | | |
|---|---|---|---|
| 2,888,061 | 5/1959 | Berlin | 297/487 X |
| 3,899,042 | 8/1975 | Bonar | 297/487 |
| 5,660,434 | 8/1997 | Nicksic | 297/487 X |
| 5,716,095 | 2/1998 | Lopez | 297/256.16 X |

Primary Examiner—Peter R. Brown

[57] ABSTRACT

A new child safety seat with a head protector for providing added protection in the event of an automobile accident. The inventive device includes a plurality of steel reinforcement bars extending through opposed side walls of a car seat in a spaced relationship. A single steel reinforcement bar extends through a front safety bar of the car seat. A head protecting frame is coupled with respect to the car seat. The head protecting frame includes an arcuate upper bar coupled with respect to an upper edge of the car seat. The head protecting frame includes an inverted U-shaped lower bar secured to a lower end of the arcuate upper bar. The inverted U-shaped lower bar has branched free ends thereof secured to the safety bar.

3 Claims, 2 Drawing Sheets

5,795,020

CHILD SAFETY SEAT WITH A HEAD PROTECTOR

BACKGROUND OF THE INVENTION

1. Field of the Invention

The present invention relates to child car seats and more particularly pertains to a new child safety seat with a head protector for providing added protection in the event of an automobile accident.

2. Description of the Prior Art

The use of child car seats is known in the prior art. More specifically, child car seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art child car seats include U.S. Pat. No. 4,790,593 to Davaloe et al.; U.S. Pat. No. 3,948,556 to Hyde et al.; U.S. Pat. No. 4,039,225 to Tomforde; U.S. Pat. No. Des. 339,477 to Kain; U.S. Pat. No. 4,500,135 to Kincheloe; and U.S. Pat. No. 4,155,591 to Mauron.

While these devices fulfill their respective, particular objectives and requirements, the aforementioned patents do not disclose a new child safety seat with a head protector. The inventive device includes a plurality of steel reinforcement bars extending through opposed side walls of a car seat in a spaced relationship. A single steel reinforcement bar extends through a front safety bar of the car seat. A head protecting frame is coupled with respect to the car seat. The head protecting frame includes an arcuate upper bar coupled with respect to an upper edge of the car seat. The head protecting frame includes an inverted U-shaped lower bar secured to a lower end of the arcuate upper bar. The inverted U-shaped lower bar has branched free ends thereof secured to the safety bar.

In these respects, the child safety seat with a head protector according to the present invention substantially departs from the conventional concepts and designs of the prior art, and in so doing provides an apparatus primarily developed for the purpose of providing added protection in the event of an automobile accident.

SUMMARY OF THE INVENTION

In view of the foregoing disadvantages inherent in the known types of child car seats now present in the prior art, the present invention provides a new child safety seat with a head protector construction wherein the same can be utilized for providing added protection in the event of an automobile accident.

The general purpose of the present invention, which will be described subsequently in greater detail, is to provide a new child safety seat with a head protector apparatus and method which has many of the advantages of the child car seats mentioned heretofore and many novel features that result in a new child safety seat with a head protector which is not anticipated, rendered obvious, suggested, or even implied by any of the prior art child car seats, either alone or in any combination thereof.

To attain this, the present invention generally comprises a car seat having a seat portion and a seat back portion. The car seat is dimensioned for receiving a child therein. The seat back portion has a loop disposed on a rear surface thereof. The loop is dimensioned for receiving an existing car seat belt therethrough for securement of the car seat on an existing automobile seat. The car seat further includes a safety bar pivotally coupled with opposing side walls thereof. The safety bar extends across the seat portion. A plurality of steel reinforcement bars extend through the opposed side walls of the car seat in a spaced relationship. A single steel reinforcement bar extends through the safety bar. A head protecting frame is coupled with respect to the car seat. The head protecting frame includes an arcuate upper bar coupled with respect to an upper edge of the car seat. The upper edge of the seat has a female quick connect secured thereto. The arcuate upper bar has a male quick connect on an upper end thereof for coupling with the female quick connect. The head protecting frame includes an inverted U-shaped lower bar secured to a lower end of the arcuate upper bar. The inverted U-shaped lower bar has branched free ends thereof secured to the safety bar.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new child safety seat with a head protector apparatus and method which has many of the advantages of the child car seats mentioned heretofore and many novel features that result in a new child safety seat with a head protector which is not anticipated, rendered obvious, suggested, or even implied by any of the prior art child car seats, either alone or in any combination thereof.

It is another object of the present invention to provide a new child safety seat with a head protector which may be easily and efficiently manufactured and marketed.

It is a further object of the present invention to provide a new child safety seat with a head protector which is of a durable and reliable construction.

An even further object of the present invention is to provide a new child safety seat with a head protector which is susceptible of a low cost of manufacture with regard to both materials and labor, and which accordingly is then susceptible of low prices of sale to the consuming public, thereby making such child safety seat with a head protector economically available to the buying public.

Still yet another object of the present invention is to provide a new child safety seat with a head protector which provides in the apparatuses and methods of the prior art some of the advantages thereof, while simultaneously overcoming some of the disadvantages normally associated therewith.

Still another object of the present invention is to provide a new child safety seat with a head protector for providing added protection in the event of an automobile accident.

Yet another object of the present invention is to provide a new child safety seat with a head protector which includes a plurality of steel reinforcement bars extending through opposed side walls of a car seat in a spaced relationship. A single steel reinforcement bar extends through a front safety bar of the car seat. A head protecting frame is coupled with respect to the car seat. The head protecting frame includes an arcuate upper bar coupled with respect to an upper edge of the car seat. The head protecting frame includes an inverted U-shaped lower bar secured to a lower end of the arcuate upper bar. The inverted U-shaped lower bar has branched free ends thereof secured to the safety bar.

Still yet another object of the present invention is to provide a new child safety seat with a head protector that protects against any impact from any side of the car seat.

Even still another object of the present invention is to provide a new child safety seat with a head protector that prevents a child from releasing himself from the car seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
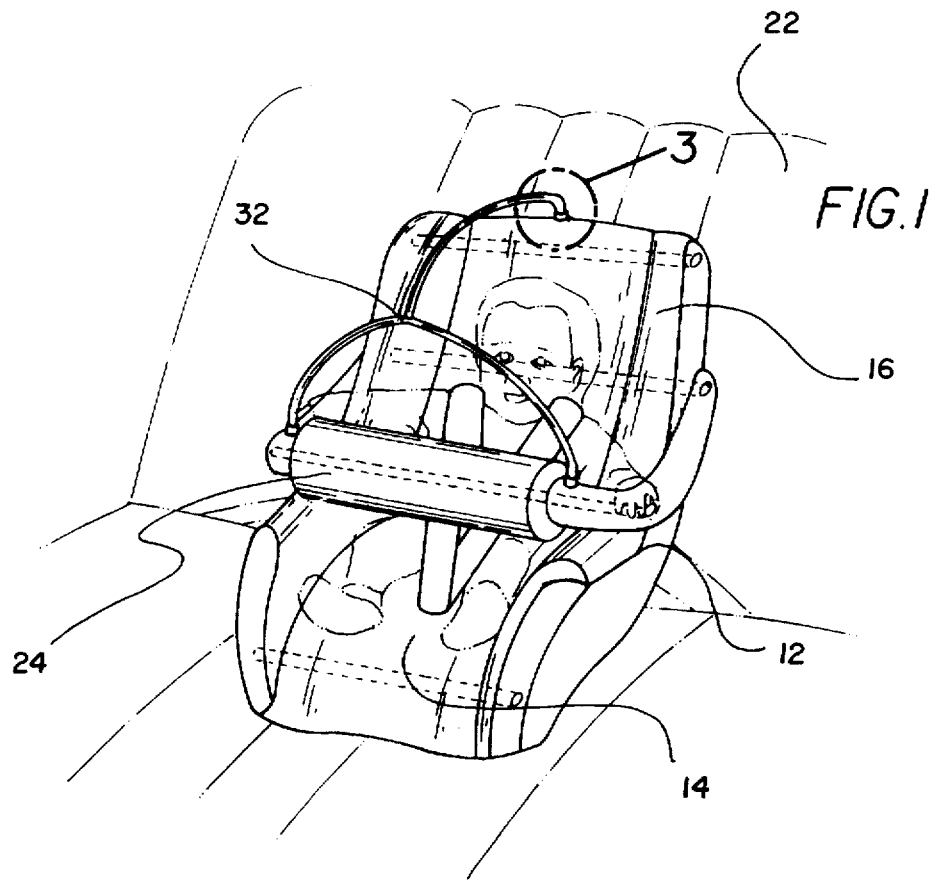
FIG. 1 is a perspective view of a new child safety seat with a head protector according to the present invention.
Figure 2:
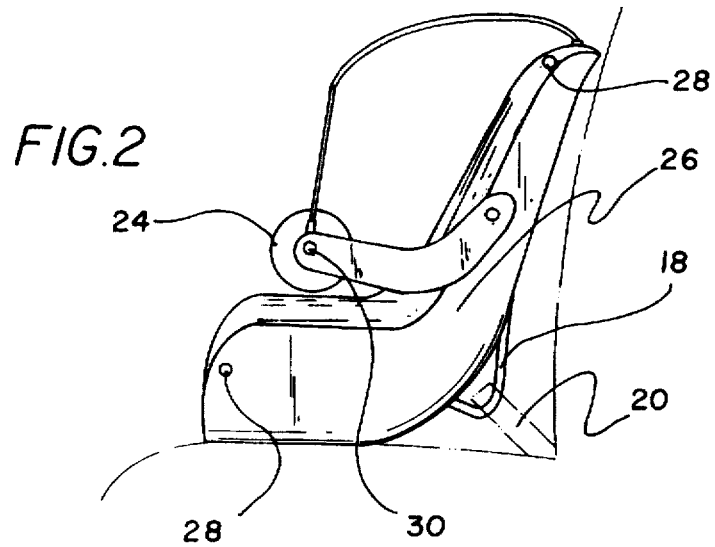
FIG. 2 is a side view of the present invention.
Figure 3:
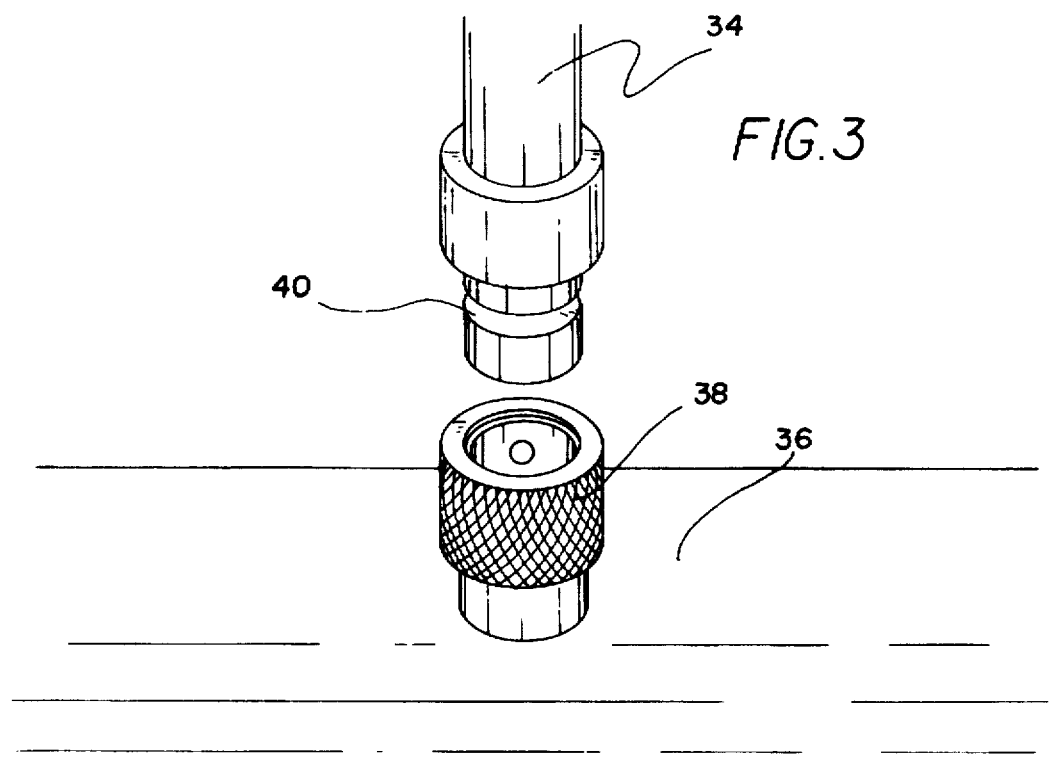
FIG. 3 is a sectional view of the present invention illustrating the quick connect coupling of the head protecting frame thereof.
Figure 4:
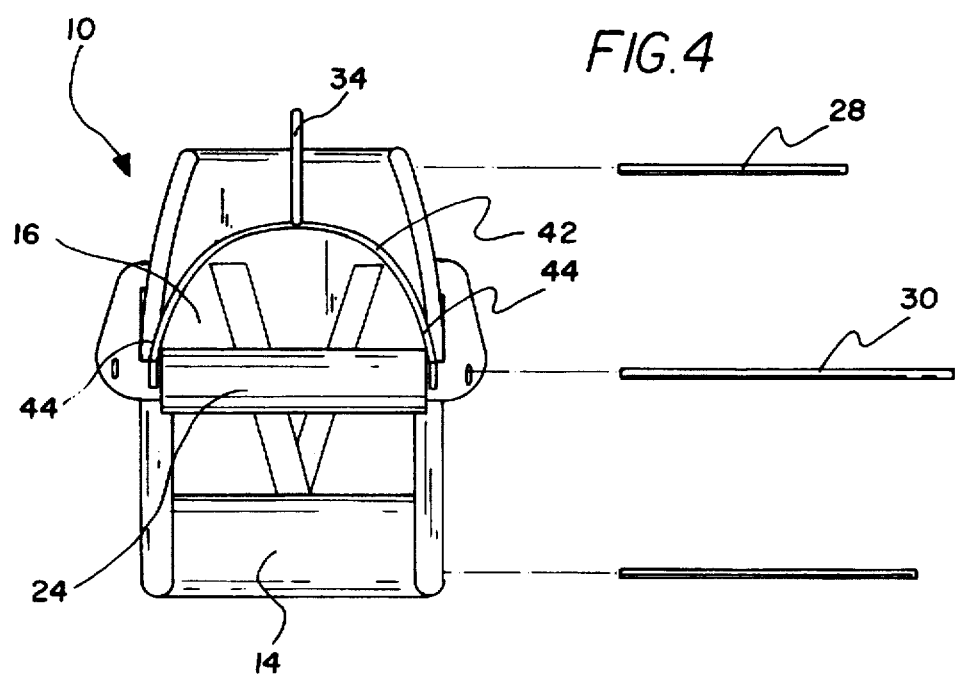
FIG. 4 is a front elevation view of the present invention illustrating th steel rods removed therefrom.

With reference now to the drawings, and in particular to FIGS. 1 through 4 thereof, a new child safety seat with a head protector embodying the principles and concepts of the present invention and generally designated by the reference numeral 10 will be described.

As best illustrated in FIGS. 1 through 4, the child safety seat with a head protector 10 comprises a car seat 12 having a seat portion 14 and a seat back portion 16. The car seat 12 is dimensioned for receiving a child therein. The seat back portion 16 has a loop 18 disposed on a rear surface thereof. The loop 18 is dimensioned for receiving an existing car seat belt 20 therethrough for securement of the car seat 12 on an existing automobile seat 22. The car seat 12 further includes a safety bar 24 pivotally coupled with opposing side walls 26 thereof. The safety bar 24 extends across the seat portion 14.

A plurality of steel reinforcement bars 28 extend through the opposed side walls 26 of the car seat 12 in a spaced relationship. A single steel reinforcement bar 30 extends through the safety bar 24.

A head protecting frame 32 is coupled with respect to the car seat 12. The head protecting frame 32 includes an arcuate upper bar 34 coupled with respect to an upper edge 36 of the car seat 12. The upper edge 36 of the car seat 12 has a female quick connect 38 secured thereto. The arcuate upper bar 34 has a male quick connect 40 on an upper end thereof for coupling with the female quick connect 38. The head protecting frame 32 includes an inverted U-shaped lower bar 42 secured to a lower end of the arcuate upper bar 34. The inverted U-shaped lower bar 42 has branched free ends 44 thereof secured to the safety bar 24.

In use, the device 10 essentially is a car seat 12 for children and infants that will provide further protection in the event of an accident. The steel reinforcement bars 28 and the head protecting frame 32 can be added to existing car seats or can be produced as a single unit. The head protecting frame 32 will protect the child or infant from being struck in the face by any type of large object in the event of an accident. The steel reinforcement bars 28 will protect the car seat 12 against any impact from either side of the car seat 12. The head protecting frame 32 will also preclude the child from releasing himself from the car seat 12. The quick connect coupling 38,40 allows for the head protecting frame 32 to be released from the car seat 12 thereby allowing the safety bar 24 to be pivoted upwardly for removal of the child.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new child safety seat with a head protector for providing added protection in the event of an automobile accident comprising, in combination:

a child's car seat having a seat portion, a seat back portion, and opposing sidewalls the car seat dimensioned for receiving a child therein, the seat back portion having a loop disposed on a rear surface thereof, the loop dimensioned for receiving an existing car seat belt therethrough for securement of the car seat on an existing automobile seat, the car seat further including a safety bar pivotally coupled with said opposing side walls, the safety bar extending across the seat portion;

a plurality of steel reinforcement bars extending through the opposed side walls of the car seat in a spaced relationship, a single steel reinforcement bar extending through the safety bar; and a head protecting frame coupled to the car seat, the head protecting frame including an arcuate upper bar coupled to an upper edge of the car seat, the upper edge of the seat having a female quick connect secured thereto, the arcuate upper bar having a male quick connect on an upper end thereof for coupling with the female quick connect, the head protecting frame including an inverted U-shaped lower bar secured to a lower end of the arcuate upper bar, the inverted U-shaped lower bar having branched free ends thereof secured to the safety bar.

2. A head protector on a child's car seat for providing added protection in the event of an automobile accident comprising, in combination:

a plurality of steel reinforcement bars extending through opposed side walls of the car seat in a spaced relationship, a single steel reinforcement bar extending through a front safety bar of the car seat; and a head protecting frame coupled to the car seat, the head protecting frame including an arcuate upper bar coupled, to an upper edge of the car seat, the head protecting frame including an inverted U-shaped lower bar secured to a lower end of the arcuate upper bar, the inverted U-shaped lower bar having branched free ends thereof secured to the safety bar.

3. The head protector for a car seat as set forth in claim 2 wherein the upper edge of the car seat has a female quick connect secured thereto, the arcuate upper bar has a male quick connect on an upper end thereof for coupling with the female quick connect.

* * * * *